United States Patent
Paranjpe (10) Patent No.: US 6,696,931 B2
(45) Date of Patent: Feb. 24, 2004

(54) RETROFITTABLE VEHICLE COLLISION WARNING APPARATUS

(75) Inventor: Ajit P. Paranjpe, Fremont, CA (US)

(73) Assignee: Directed Electronics, Inc., Vista, CA (US)

( * ) Notice: Subject to any disclaimer, the term of this patent is extended or adjusted under 35 U.S.C. 154(b) by 133 days.

(21) Appl. No.: 09/938,897

(22) Filed: Aug. 24, 2001

(65) Prior Publication Data

US 2002/0030591 A1 Mar. 14, 2002

Related U.S. Application Data

(63) Continuation-in-part of application No. 09/159,137, filed on Sep. 23, 1998, now Pat. No. 6,339,369.

(51) Int. Cl.[7] .................................................. B60Q 1/00
(52) U.S. Cl. ........................................ 340/436; 340/502
(58) Field of Search ................................. 340/436, 435, 340/502, 903, 904

(56) References Cited

U.S. PATENT DOCUMENTS

| | | | | |
|---|---|---|---|---|
| 5,142,278 A | * | 8/1992 | Moallemi et al. | 340/505 |
| 5,266,925 A | * | 11/1993 | Vercellotti et al. | 340/505 |
| 6,052,068 A | * | 4/2000 | Price R-W et al. | 340/933 |
| 6,167,333 A | * | 12/2000 | Gehlot | 701/35 |
| 6,339,369 B1 | * | 1/2002 | Paranjpe | 340/436 |

* cited by examiner

Primary Examiner—John Tweel
(74) Attorney, Agent, or Firm—Daniel L. Dawes; Myers Dawes Andras & Sherman LLP (57) ABSTRACT

A retrofittable collision warning apparatus for vehicles comprises a base unit within the vehicle cabin and a plurality of remote units located around the periphery of the vehicle. The remote units generally operate in a low-power sleep mode, and periodically go partially active to listen for wakeup inputs from the base unit, at which time the remote units enter a highest-power active mode to measure the distance between the vehicle and obstacles in the proximity, and use wireless transmission to communicate obstacle position information to the base unit. The base unit accepts operator commands, use wireless communication to transmit control signals to the remote units and receives obstacle position information from the remote units, communicates obstacle position information to the operator through audio and/or visual signals, and controls operation of the collision warning apparatus. The base and remote units employ power conservation and voltage boosters to extend the lifetime of compact, low voltage on-board power sources and communicate through wireless means. Auto detection and configuration of remote units are incorporated for easy system expandability.

16 Claims, 3 Drawing Sheets

RETROFITTABLE VEHICLE COLLISION WARNING APPARATUS

This application is a Continuation-in-Part of prior application Ser. No. 09/159,137 filed on Sep. 23, 1998, now U.S. Pat. No. 6,339,369.

BACKGROUND OF THE INVENTION

1. Field of the Invention

This invention relates in general to vehicular collision avoidance systems and in particular to an easily retrofittable, collision warning apparatus for vehicles that alerts the operator to potential obstacles in the vicinity of the vehicle during operations such as parking and driving in stop and go traffic conditions.

2. Description of Related Art

Traffic statistics show that every 1.6 minutes, a driver backs up into trouble with their car. Children and animals are at risk constantly. Restricted operator visibility in front of the vehicle is a problem for school buses. Young children darting into an obscured area of the bus unseen by the operator have contributed to fatalities. A major cause of vehicle accidents today involves front-to rear collisions, particularly in stop and go traffic. Insufficient room between vehicles is the primary cause of rear end collisions. Most vehicles have one or more blind spots surrounding the vehicle which cannot be easily observed by the motorist. These blind spots are usually located at the rear corners of the vehicle due to obstructions that block a full view. This is particularly apparent when the vehicle is being reversed, in which case, lack of full view may cause collisions resulting in loss of life and property. In another instance, when a motorist is pulling into or backing out of a parking space, it is difficult for the motorist to maintain attention simultaneously on all sides of the vehicle in order to avoid hitting adjacent objects such as other cars. Not only do such accidents result in loss of life and injuries, but drive up the cost of automobile insurance and repairs. These types of incidents account for the majority of accidents involving vehicles and have spurred the development of collision warning systems.

Parking a vehicle accurately within a garage requires accurate positioning to prevent contact with the front wall and objects placed along the wall, while providing sufficient clearance behind the vehicle. The detection of objects around a vehicle is an ever-growing concern, especially with the increased popularity of the larger vehicles such as minivans, trucks, and RVs.

The simplest collision warning systems are passive. They comprise a system of mirrors, markers, and feelers installed around the periphery of the vehicle. These give the operator a visual indication of the extremities of the vehicle so that the operator can estimate the spatial separation between the vehicle and nearby obstacles. Such techniques have limited utility since they rely on the visual acuity and depth perception of the individual, and are ineffective in poor lighting conditions. Luxury car makers have begun to offer active parking aids as standard equipment on their higher end models. An example is the Parktronics system from Mercedes Benz. These systems utilize a plurality of distance measuring sensors mounted around the periphery of the vehicle in the vicinity of the vehicle fenders. The distance measuring sensors are connected to a display and warning system mounted in the vehicle dashboard that provides a continuous indication of potential obstacles in the vehicle's path during operations such as parking. Such is the usefulness and urgency for such a collision warning system that it is expected to be standard equipment on all new cars by the end of the decade. Since the typical life span of the average car in the US is well over a decade, it will be a long time before all the vehicles are equipped with collision warning systems. Thus, there is an urgent need for a collision warning system that is easily retrofittable to existing vehicles for them to remain compliant with evolving safety standards for vehicles.

To address this need, Topix has recently introduced the Mini II car reversing aid that comprises a distance indicator unit mounted within the passenger cabin, and a plurality of distance measuring sensors that are connected to the rear bumper. The distance indicator unit provides a readout of the distance and/or an audio signal indicative of distance to an object. Similar systems are available in kit form such as the K3502 parking radar from Velleman Kits. For all these systems, the distance measuring sensor has to be electrically connected to the electrical system of the vehicle as well as to an indicator unit mounted within the passenger compartment. Electrical wiring that is preferably concealed has to be installed between the indicator unit and the distance measuring sensors.

Several embodiments of collision warning and avoidance systems have been described in the prior art. Schofield U.S. Pat. No. 5,786,772 describes a passive mirror based system. Sindle U.S. Pat. No. 3,842,397 describes an ultrasonic distance detector for vehicles using a plurality of transducers located around the sides of the vehicle and connected to transmitters for sending sonic pulses to distant objects. Each of the transducers is connected to a receiver for detecting sonic echoes from close objects. The output of each receiver is connected to individual indicator lamps and a warning device such as a horn so that if any of the lamps are energized, the driver is warned that one side of the vehicle is in danger of a collision. The warning is activated if the obstacles are within a predetermined distance that is set based on the speed of the vehicle.

A variety of distance measuring sensors employing ultrasonic, radio frequency, microwave, optical, and video techniques for distance sensing have been described. These sensors determine the proximity of different sides of a vehicle with respect to external objects. For short distance sensing applications (i.e. sensing distances under 10 feet), ultrasonic sensing is the preferred method. Various embodiments and refinements using ultrasonic sensors for collision warning systems have been described in Sindle U.S. Pat. No. 3,842,397, Sindle U.S. Pat. No. 4,015,232, Duncan U.S. Pat. No. 4,240,152, Vancha U.S. Pat. No. 4,326,273, Kodera U.S. Pat. No. 4,404,541, Kodera U.S. Pat. No. 4,442,512, Tsuda U.S. Pat. No. 4,490,716, Gelhard U.S. Pat. No. 4,500,977, Bruggen U.S. Pat. No. 4,561,064, Tsuji U.S. Pat. No. 4,658,385, Miller U.S. Pat. No. 4,694,295, Riedel U.S. Pat. No. 4,910,512, Forster U.S. Pat. No. 4,980,869, Friberg U.S. Pat. No. 5,208,586, Truesdell U.S. Pat. No. 5,229,975, Oualiwa U.S. Pat. No. 5,235,316, Gauthier U.S. Pat. No. 5,303,205, Park U.S. Pat. No. 5,483,501, Waffler U.S. Pat. No. 5,726,647, and Akuzawa U.S. Pat. No. 5,546,086. Similar devices are also described in Park U.S. Pat. No. 5,483,501 and Toda U.S. Pat. No. 5,515,341.

Other distance sensing means that have been described include capacitive (Stahovec U.S. Pat. No. 4,300,116), light based (Endo U.S. Pat. No. 4,383,238), radar (Manor U.S. Pat. No. 4,700,191, Pakett U.S. Pat. No. 5,517,196, and Henderson U.S. Pat. No. 5,670,962), doppler radar (Dombrowski U.S. Pat. No. 4,797,673 and Gallagher U.S. Pat. No. 5,453,740), optical imaging (Dye U.S. Pat. No.

4,872,051, Bottesch U.S. Pat. No. 5,166,681, and Truesdell U.S. Pat. No. 5,229,975), electro-optic (Taylor U.S. Pat. No. 5,249,157), infrared (Suds U.S. Pat. No. 5,463,384), laser radar (Straw U.S. Pat. No. 5,529,138), radiant energy (Cho U.S. Pat. No. 5,646,613), video imaging (Abersfelder U.S. Pat. No. 5,646,614), electromagnetic radiation (Signore U.S. Pat. No. 5,682,136), articulated reflector (Richardson U.S. Pat. No. 5,714,947), and MMIC (Agravante U.S. Pat. No. 5,767,793).

Radar and doppler radar systems are best suited for long range sensing and do not provide sufficient accuracy for objects closer than ten feet. In addition, they are expensive, lack signal directionality, and need regular maintenance and calibration. Infrared detectors are prone to errors caused by temperature fluctuations. Reflections from nearby objects or reflective surfaces reduce the sensitivity of the infrared sensors. The viewing angle of these systems is limited. Light transmissions are obscured by dust, snow, rain or other environmental factors. To circumvent the limitations of a single sensor technology, multiple sensing techniques may be combined as described by Yoshioka U.S. Pat. No. 5,479,173, Shaffer U.S. Pat. No. 5,612,883, and Nashif U.S. Pat. No. 5,754,123.

Reliability, insensitivity to environmental conditions, and robustness in hostile environments are some of the other key requirements. Ultrasonic sensing is the preferred technique based on these factors. The short-range constraint for ultrasonic sensing makes them unsuitable for vehicles traveling over 5–10 miles per hour.

In addition to distance, the warning can also be generated based on speed, direction and the likelihood of the vehicle hitting the obstacles as has been described in Chey U.S. Pat. No. 4,626,850, Shyu U.S. Pat. No. 5,091,726, Shaw U.S. Pat. No. 5,314,037, Katiraie U.S. Pat. No. 5,347,273, Waffler U.S. Pat. No. 5,477,461, Gaus U.S. Pat. No. 5,572,484, Yoshioka U.S. Pat. No. 5,585,798, Arai U.S. Pat. No. 5,680,117, Gilon U.S. Pat. No. 5,684,474, Kikuchi U.S. Pat. No. 5,731,779, Smithline U.S. Pat. No. 5,734,336, Shirai U.S. Pat. No. 5,751,211, Harron U.S. Pat. No. 5,764,136 and Minissale U.S. Pat. No. 5,777,563.

The warning may be communicated by means of a display within the cabin (Lee U.S. Pat. No. 4,943,796 and Blank U.S. Pat. No. 5,708,410), lights on the outside of the vehicle to alert other drivers (Caine U.S. Pat. No. 4,600,913), external speakers to alert other drivers (Sindle U.S. Pat. No. 5,173,881), audible signals emanating from various zones of the car (Takeuichi U.S. Pat. No. 4,528,563), audible tones of varying frequency (Hollowbush U.S. Pat. No. 5,059,946 and Abst U.S. Pat. No. 5,339,075) and inter-vehicle communication (Huskier U.S. Pat. No. 5,068,654).

Collision warning systems have evolved to collision avoidance systems in which the trajectory of the vehicle is automatically or manually altered in order to avoid collisions. The warning signals may be used to calculate safe stopping parameters (Emry U.S. Pat. No. 5,436,835) and used to take corrective action such as guiding the driver to take evasive action (Shyu U.S. Pat. No. 4,931,930), assisting the driver during parking (Hoetzel U.S. Pat. No. 5,587,938, Czekaj U.S. Pat. No. 5,742,141), and automatically engaging the vehicles control system to prevent collision (Dombrwski U.S. Pat. No. 4,803,488, David U.S. Pat. No. 4,833,469, Dombrowski U.S. Pat. No. 4,864,298, Reppas U.S. Pat. No. 5,598,164, and Katoh U.S. Pat. No. 5,748,477).

Adams U.S. Pat. No. 5,528,217 describes retrofitting vehicles with collision warning systems using the existing electrical systems. Vehicles pre-wired during manufacture with wiring harnesses used to operate and monitor such vehicle functions as, side and back marker lights, license plate lamps, turn signal and hazard lamps, stop lamps, back-up lights and anti-lock brake devices can be retrofitted. However, since this method involves modification of the original equipment wiring, it may void manufacturer warranty unless performed by an accredited professional.

The requirement for professional or factory installation for prior art systems, involves considerable inconvenience and expense, and is the singular drawback that has slowed their widespread acceptance as retrofits to existing vehicles. An important requirement for ease of retrofit is the elimination of cables between the distance sensors and the display unit as well as cables to each of these units to provide electrical power. Use of wireless communication between the display and the distance sensors (Smithline U.S. Pat. No. 5,734,336) eliminates the set of wires required for communication. Wireless communication with external devices for vehicles is well known. For example keyless car entry, remote garage door openers, and remote car alarms are in widespread use. Schofield U.S. Pat. No. 5,798,688 describes installation of an electromagnetic communication circuit on a rear view mirror assembly, the communication circuit being used to communicate with external devices such as keyless entry systems and garage door openers. Various modes of communication have been disclosed in vehicle collision avoidance systems. The communication may use infrared means, RF means (Smithline U.S. Pat. No. 5,734,336), microwave means (Lemelson U.S. Pat. No. 5,983,161), and ultrasonic means (Kayo U.S. Pat. No. 4,580,250).

Incorporation of an on-board battery that is preferably rechargeable eliminates the need for external wiring. Pena U.S. Pat. No. 5,801,646 describes a traffic alert system in which a ground mounted strobe has a backup battery that is recharged using a solar panel. Unfortunately, solar panels are not well-suited for vehicular applications, especially when they are to be mounted on the vehicle exterior. Solar panels are fragile and are susceptible to damage. Any dust that settles on the solar panel drastically decreases its power generation capability. Most importantly, they are relatively expensive and require a large surface area to generate sufficient power for a retrofittable collision avoidance system.

Implementation of wireless communication and an on-board battery for the remote units is the first step in achieving an easily retrofittable collision avoidance system. However, additional improvements are desirable for a commercially viable device. Since ease of retrofittability has not been a primary concern of the prior art, these improvements have not been anticipated or applied in the prior art. For retrofittable collision avoidance systems, means must be developed to conserve on-board battery power to achieve a long battery life. This is essential since a battery charging source such as the solar panel described by Pena (U.S. Pat. No. 5,801,646) is impractical. Customers demand battery life exceeding several months for ease of maintainability. In addition, the on-board battery must be very compact so that a small size can be achieved for the distance measuring sensors and the display unit. Ideally the distance measuring sensors and the display units must be smaller than 4"×1"×1" so that they are aesthetically pleasing and can be easily mounted to the vehicle bumper or license plate and vehicle dashboard respectively. Recently compact, ½AA sized batteries operating at 3.6 V with rated capacity of 1 Ah have become available. These batteries are ideally suited from the size viewpoint, but their output voltage is too low to power traditional collision warning systems. These systems have been designed to operate from vehicle power which ranges from 12 V–24 V.

To achieve a retrofittable device for the consumer market, several improvements must be made to the collision avoidance system proposed by Smithline (U.S. Pat. No. 5,734, 336). These include the ability to operate for extended periods from compact, low voltage battery sources and ease of system expandability from a single sensor to a plurality of sensors. Incorporation of these improvements will enable a compact, easily expandable retrofittable collision avoidance system.

Power consumption can be reduced by employing power management such as has been described in pending application Ser. No. 09/159,137. This prior application provides for an unswitched and switched power supply to selectively supply power to various circuits to turn them on as needed with the objective of lowering the power consumption. The circuits are turned off when not in use. Thus power consumption is reduced several fold. Another desirable feature is to activate the remote units based on a wireless wakeup command from the base unit to further reduce power consumption. This application describes additional improvements to the embodiments described in the prior application to enable operation from a compact, low voltage battery source and achieve a long battery life. Consumers would not like to replace the battery more frequently than once every few months. In the prior application a conventional RF receiver that was powered by the unswitched power means was used. Power consumption by such wireless receivers is in the mW range, which would translate to approximately 1 month of battery life for a compact, low voltage battery. Thus a lower power consumption by the receiver is required if a battery life of several months is to be achieved.

To achieve more effective power conservation, an advanced receiver that has programmable sleep and active modes replaces the conventional receiver in the remote units. A conventional receiver can be upgraded by combining it with a microcontroller that supports a sleep mode. Such a receiver or a receiver/microcontroller combination switches from an ultra-low power sleep mode to a higher power active mode for a brief duration (for e.g. 5–20 ms) periodically (e.g. every 1–3 s) to listen for a wakeup signal from the base station. The duration of the sleep and active modes is normally programmable so that it can be optimized for a specific application. If no wakeup signal is detected, the wireless receiver returns to its lowest power sleep mode. When a wakeup signal is detected, the receiver switches to the active mode and signals the switched power means to selectively supply power to the various circuits in the remote units. This mode of operation reduces power consumption in the remote units to the microwatt level when the colision warning system is idle. A similar receiver may be used in the base unit as well to lower power consumption. Most receivers of this type are packaged as transceivers that can transmit as well as receive signals. Thus more elaborate signaling techniques between the transceivers in the base and remote units can be devised.

The collision warning system remains mostly in the idle state unless activated by the user. Typically, the user might activate the system for periods ranging from a few minutes to a couple of hours each day. Thus lowering power consumption in the idle mode is vital to increasing the battery life. This additional power conservation is necessary in order to achieve the desired battery life of over three months. The circuit topology for realizing this enhanced mode of power conservation has not been anticipated or applied to collision warning or traffic alert systems.

Several circuit elements in the collision warning system require operating voltages exceeding 9 V and often as high as 15 V–30 V. For example, ultrasonic transducers used for distance sensing require drive voltages of 12 V–30 V. This conflicts with the desire to use a compact, low voltage on-board battery. Even with the most efficient battery technology such as a lithium battery, the highest voltage from a single battery is 3.6 V, which is more than twice the voltage delivered by a conventional alkaline battery. Stacking multiple batteries in series to achieve the desired voltage while feasible is impractical because of size and cost constraints. If smaller batteries are stacked in series to boost the voltage, the battery capacity is compromised assuming that the total battery size remains unchanged. A more practical approach is to employ voltage booster circuits for powering circuits that need higher voltages. These voltage boosters are capable of generating output voltages of 6 V–30 V using low input starting voltages (e.g. 1 V–5 V). Voltage boosters have not been described in the prior art on collision warning systems.

A retrofittable system must also be easily expandable so that the user can easily add or remove distance measuring sensors from the system with minimum effort. An auto configuration capability in which the system automatically detects its configuration and adjusts its operation accordingly is desirable. Once again, this feature has not been anticipated or applied to existing collision warning systems.

The object of the present invention is to improve upon the collision warning system described in Ser. No. 09/159,137 with the aforementioned features so that an easily expandable, compact, collision warning apparatus can be installed quickly and easily by the average vehicle operator, without compromising performance and functionality. The principal elements of this invention are the subject of this application.

SUMMARY OF THE INVENTION

The object of the present invention is to provide a retrofittable collision warning apparatus for vehicles that when enabled by the operator, senses the distance between the vehicle and obstacles in the vicinity, and communicates the information to the operator through audio and/or visual means. A vehicle collision warning apparatus that warns an operator of obstacles in the vicinity of the vehicle, in accordance with the present invention, comprises: a base unit means located within a cabin of said vehicle that accepts said operator commands, controls operation of said collision warning apparatus, and communicates said obstacle position information to said operator; and a remote unit means located around the periphery of said vehicle that respond to inputs from said base unit means, measures the distance between said vehicle and said obstacles in the proximity, and communicates said obstacle position information to said base unit means through wireless means, and wherein the remote unit means includes an unswitched power means that supplies power to a receiving means for receiving wireless signals from said base unit means and a switched power means for supplying power to additional circuits within said remote unit means based on a wireless transmission from said base unit.

The novel features of the invention are described in the appended claims, but the invention, in both organization and content, will be better understood and appreciated, from the following detailed description provided in conjunction with the drawings.

Most of the figures are for illustrative purposes only, and do not necessarily depict the actual relative sizes or positions of the elements shown.

DETAILED DESCRIPTION OF THE PREFERRED EMBODIMENTS

Figure 1:
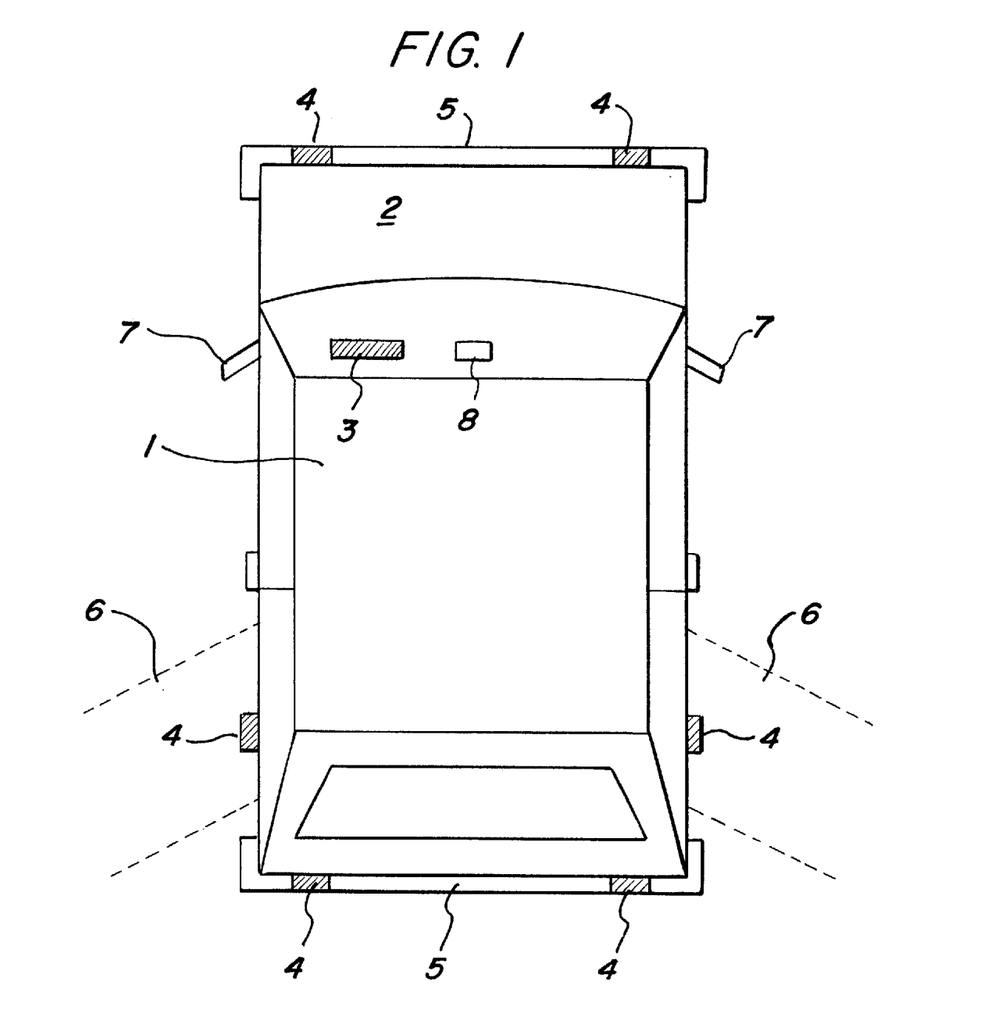
FIG. 1 is a view of the preferred embodiment of the present invention showing the installation of the collision warning apparatus.

The preferred embodiment of the present invention is described with reference to the relevant figures. The preferred embodiment uses standard, off-the-shelf components, for simplicity, although several modifications are possible to reduce size and cost. FIG. 1 shows the vehicle 1 with collision warning apparatus 2. The collision warning apparatus 2 comprises base unit 3 installed within the cabin of vehicle 1, and a plurality of remote units 4 arranged around the periphery of vehicle 1. The operator may choose to install as few as one remote unit depending on the region to be sensed. Base unit 3 may be attached to the vehicle dashboard, rear view mirror or to any other location based on operator preference. Remote units 4 are preferably attached to vehicle 1 in the proximity of fenders 5 using adhesive, two-sided tape, or screws. Remote units 4 should be mounted so that they are free of obstructions. Remote units 4 may also be mounted to the license plate of the vehicle or may be incorporated into the license plate frame. FIG. 1 shows a collision warning apparatus 2 consisting of six remote units 4, four of which are mounted on the front and rear fenders 5, and the remaining two are mounted on the left and right hand sides of vehicle 1 within the blind spot region 6. The blind spot region is the portion that is not directly visible to the operator in side-view mirror 7 or rear-view mirror 8. Remote units 4 are preferably contained in a well-sealed package to withstand harsh environmental conditions. In the preferred embodiment, which uses ultrasonic distance sensors, the front face of the remote unit (from which distances to obstacles is measured) may have a Fresnel lens that transmits and focuses the exiting and incident ultrasonic radiation.

Figure 2:
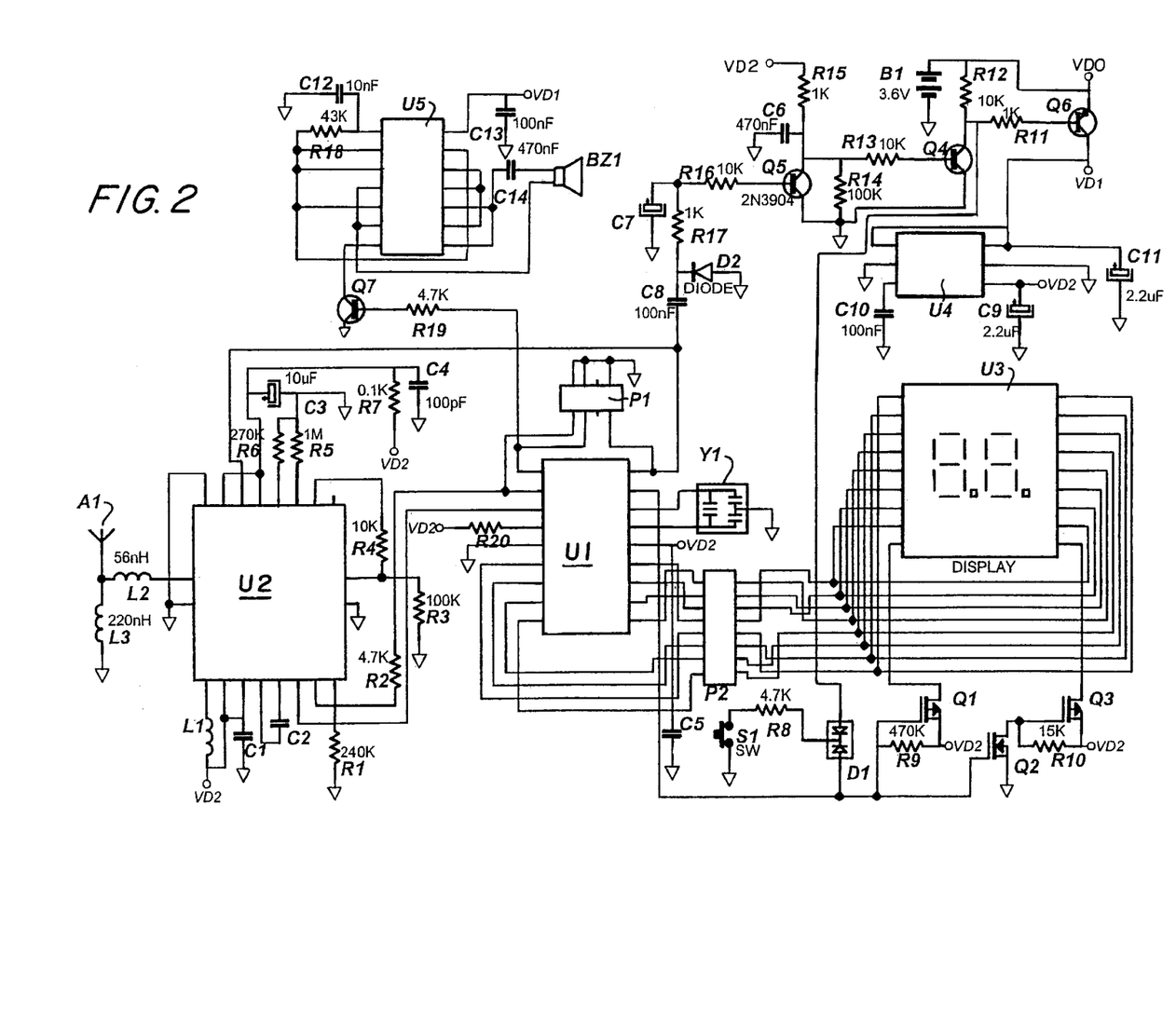
FIG. 2 is a view of the preferred embodiment of the base unit.
Figure 3:
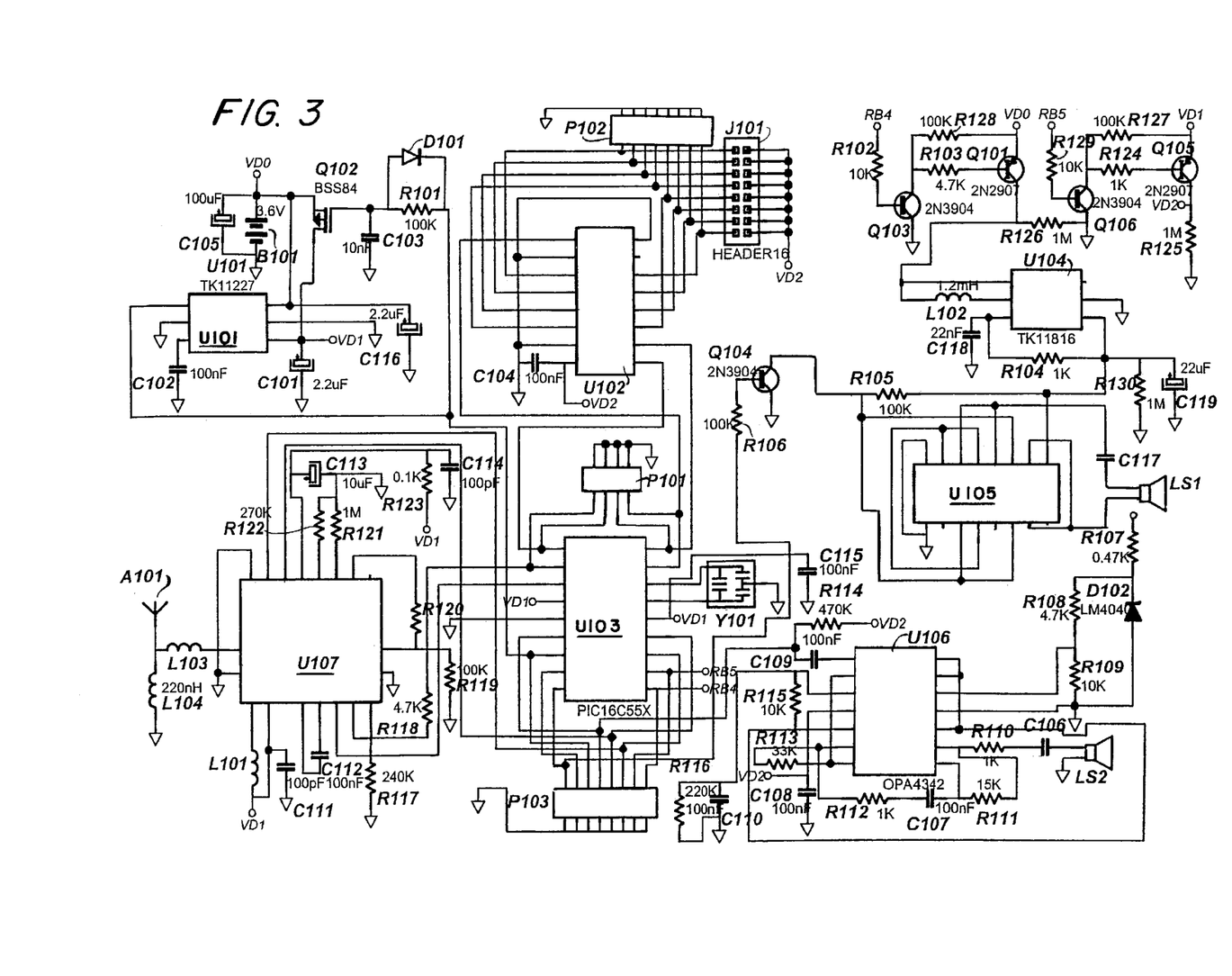
FIG. 3 is a view of the preferred embodiment of the remote unit.

The preferred embodiment of base unit 3 and remote unit 4 is shown in FIGS. 2 and 3. Compared to the embodiments described in prior application Ser. No. 09/159,137, the preferred embodiment achieves a higher level of power conservation, enables operation from a low voltage battery, and offers greater operational flexibility.

FIG. 2 shows the details of a preferred embodiment of base unit 3. It consists of a base unit control circuit, a power conservation circuit, a wireless transceiver circuit, a warning indicator circuit and on-board battery B1. The on-board battery may be substituted with external power or solar power. The system may be configured so that the power sources can be manually or automatically switched. External power could be the cigarette lighter receptacle that is a standard feature in vehicles. The warning indicator circuit consists of a display circuit and/or a buzzer circuit for audio alert.

The base unit control circuit consists of microcontroller U1, resistor packs P1 and P2, resistor R20, capacitor C5 and ceramic resonator Y1.

The power conservation circuit consists of regulator U4, transistors Q4, Q5 and Q6, diodes D1 and D2, resistors R8, R11–R16, capacitors C6–C11 and momentary-on switch S1. The wireless transceiver circuit consists of transceiver U2, resistors R4–R7, capacitors C1–C4, inductors L1–L3, and antenna A1. Although a RF transceiver is shown, other wireless transmission means such as infrared, microwave and ultrasonic may be used. The preferred method for this application is RF because it does not rely on line-of-sight transmission and has superior noise immunity. A number of transceivers such as TR1000 and TR3000 from RF Monolithics, TX99/RE99 from Ming Electronics and K6706/K6707 from Velleman operating in the industrial bands within the frequency range of 300 MHz–2.45 GHz may be used. Higher RF frequencies are more noise immune, require smaller antennas, and can sustain higher data transmission rates. For RF transceivers either an on-board antenna in the form of a loop trace on the printed circuit board or an external antenna may be used. The external antenna which generally improves signal fidelity could be a retractable mini-antenna or a foil strip antenna that is pasted to the surface of the windshield of vehicle 1. Many vehicles already employ a foil strip AM/FM stereo antenna pasted to the surface of the front or rear windshield.

The display circuit consists of dual seven segment display U3, transistors Q1 and Q3, and resistors R9–R10.

The buzzer circuit consists of buzzer driver U5, transistor Q7, resistors R18–R19, capacitors C12–C14, and buzzer BZ1.

FIG. 3 shows the details of the preferred embodiment of remote unit 4. It comprises a remote unit control circuit, a power conservation circuit, a voltage booster circuit, a wireless transceiver circuit, a system identification circuit, a distance measuring circuit and on-board battery B101. The on-board battery may be substituted with external power or solar power. The system may be configured so that the power sources can be manually or automatically switched. External power could be an electrical connection from the vehicles tail lights or trailer power connector that is standard on most vehicles. The distance measuring circuit consists of an ultrasonic tone generation circuit and an ultrasonic echo detection circuit. Other distance sensing methods such as microwave, radar, and lasers can also be used, but ultrasonics are preferred because of robustness and low cost.

The remote unit control circuit consists of microcontroller U103, resistor packs P101 and P103, capacitor C115 and ceramic resonator Y101.

The power conservation circuit consists of voltage regulator U101, transistors Q101–Q105, diode D101, resistors R101–R103 and R124–R129, and capacitors C101–C103, and C105.

The voltage booster circuit consists of voltage booster U104, resistors R104 and R130, capacitors C118 and C119, and inductor L102. In this embodiment, the voltage booster circuit is used to power the ultrasonic tone generation circuit. If the 3.6 V lithium battery is substituted by a lower voltage battery (e.g. silver oxide or alkaline cells), voltage boosters will have to be used to power some of the other circuits as well. Since voltage boosting is not 100% efficient, voltage boosters should be used with prudence.

The wireless transceiver circuit is designed to be compatible with the wireless transceiver circuit in the base unit and consists of transceiver U107, resistors R117–R123, capacitors C111–C114, inductors L101, L103, and L104, and antenna A101. For RF transceivers either an onboard antenna in the form of a loop trace on the printed circuit board or an external antenna may be used. The external antenna which generally improves signal fidelity could be a retractable mini antenna or a foil strip antenna that is pasted to the surface of the remote unit 4.

The system identification circuit consists of shift register U102, resistor pack P102, capacitor C104 and jumper J101.

The ultrasonic tone generation circuit consists of driver U105, transistor Q104, resistor R105, capacitor C117 and ultrasonic transmitter LS1.

The ultrasonic echo detection circuit consists of amplifier U106, voltage reference D102, resistors R107–R116, capacitors C106–C110, and ultrasonic receiver LS2.

The operation of collision warning apparatus 2 is now explained with reference to FIGS. 1, 2 and 3. Collision warning apparatus 2 is normally de-energized to conserve power and becomes energized and activated in response to operator input. The operator activates collision warning apparatus 2 by momentarily pressing switch S1. The software program in microcontroller U1 determines the duration for which collision warning apparatus 2 remains energized. For example, the user can select the activation time by pressing switch S1 multiple times so that the activation time advances in the sequence 1, 2, 5, 10, 20, 40 and 60 minutes. Other selections are possible by modifying the software program in microcontroller U1. Short activation times of 1–2 minutes that invoke the 'Park' mode are used when the operator is trying to park the car. Longer activation times of 5–60 minutes that invoke the 'Drive' mode are used when the operator wants to use the system while driving. In this manner, collision warning apparatus 2 is activated only when required. At the end of the activation period, collision warning apparatus 2 becomes de-energized to conserve power.

One function of switch S1 is to control the operation of the power conservation circuit. Switch S1 is used to turn collision warning system 2 on and off. Momentarily pressing switch S1 causes transistor Q6 to conduct which makes unregulated voltage available at terminal VD1 and regulated voltage available at terminal VD2. These two terminals supply power to the other circuits. With power available at VD2, transistor Q4 is turned on which holds transistor Q6 in the on state when switch S1 is released. Before switch S1 is depressed power consumption is in the microwatt range and is solely due to leakage currents in the electrical circuits. Power consumption increases to the milliwatt range when switch S1 is momentarily pressed since the electrical circuit is powered on. Operation of the base unit is controlled by the software program residing in microcontroller U1. A typical sequence of operations executed by the microcontroller U1 is as follows once switch S1 is momentarily depressed:

1. Display the default activation time of 1 minute on the display. Increment the activation time in the sequence 2, 5, 10, 20, 40 and 60 minutes if switch S1 is pressed multiple times. Display activation time on display. If no further user input is sensed on switch S1 for a period of say 2 seconds proceed to step 2.
2. Turn on remote units by transmitting an identification code that serves as a wakeup signal to the remote units through the wireless transceiver circuit.
3. Determine how many remote units are connected and responding by transmitting a polling signal to each remote unit in turn through the wireless transceiver circuit and listening for the corresponding wireless response from each remote unit.
4. Set the system configuration based on the number and identity of remote units that respond to the polling signal in step 3.
5. Obtain distance data from each remote unit detected in step 4 by transmitting a distance request signal to each remote unit and listening for a distance signal data signal from the corresponding remote unit.
6. Determine minimum distance by comparing distance data signals received in step 5 and display minimum distance detected through display circuit. The display circuit can also be used to display the identity of the remote unit that has detected the minimum distance.
7. Alert driver of impending collision by sounding the buzzer through buzzer circuit if minimum distance detected is less than a preset distance. For example, the preset distance could be 1.5' feet in the 'Park' mode and 4' feet in the 'Drive' mode.
8. Check if the operator wants to manually turn off base unit 3 by checking if switch S1 is pressed. If switch S1 is pressed go to step 9. Otherwise repeat steps 5–8 until the preset activation time selected in step 1 has elapsed. The sequence of steps 5–8 can be repeated so that the distance display is updated 2–3 times each second. More frequent updates are wasteful of power and add little value since the driver cannot respond to the information on time scales shorter than 0.5 seconds.
9. When the preset activation time defined in step 1 has elapsed, microcontroller U1 generates a signal to turn off the power conservation circuit, which terminates power delivery to all the other circuits and returns the base unit to its state before switch S1 was depressed. The software program described in step 1–9 can be modified in several ways to fine-tune the performance of the collision warning system and to customize it for different end applications.

The identification code transmitted by base unit 3 identifies the base unit to remote units 4 so that only remote units 4 that share the identification code with base unit 3 are addressed. Each collision warning apparatus 2 will have a unique system identity to prevent cross communication between multiple vehicles employing the same collision warning apparatus 2 that are in the immediate vicinity of each other. The communication method described here is polling since it is the simplest communication protocol for this particular application, although more advanced protocols such as time division multiple access (TDMA), code division multiple access (CDMA) and digital spread spectrum (DSS) may be used for superior noise immunity. To further reduce error rates during communication, the polling, distance request and distance data signals can be repeated multiple times and include error correction schemes. All of these techniques have been discussed widely in the wireless transmission literature.

The detailed operation of each of the circuits in base unit 3 is now described. The various circuits are controlled by the input/output (I/O) ports of microcontroller U1. The I/O ports are marked as RA0–RA4 and RB0–RB7. The power conservation circuit supplies power to the other circuits through terminals VD1 and VD2 when switch S1 is momentarily depressed. The power output at VD2 is a regulated voltage. For example, if a 3.6 V battery is used, the battery voltage declines from 3.6 V at beginning of life to 2.8 V at the end of life. In this instance, voltage regulator U4 produces a regulated output voltage VD2 of 2.7 V irrespective of battery voltage. The regulated voltage VD2 is used to provide power to voltage sensitive circuits such as the base control circuit, the transceiver circuit and the display circuit. To turn off the power conservation circuit, a signal (AC signal) is generated on port RA1. This AC signal is rectified and fed to a low pass filter. The output of the low pass filter turns on transistor Q5, which then turns off transistor Q4 and turns off transistor Q6. This restores base unit 3 to its completely off state.

To operate the transceiver circuit, microcontroller U1 first puts transceiver U2 in the transmit or receive mode by defining port RA1 to be high or low. Once transceiver U2 is placed in the transmit mode, a data stream is fed serially to transceiver U2 through port RA3. If transceiver U2 is placed in the receive mode, the data stream is received serially from transceiver U2 through port RA4.

To operate the display circuit, first the digit on the display to be illuminated is selected by defining port RA0. A high on RA0 selects one digit, while a low on RA0 selects the other digit. Next the ports RB0–RB7 are defined to illuminate the desired segments and display the number or alphabet on the selected digit. The digits are alternatingly selected in a rapid sequence to provide a flicker free display of the distance to the user. To obtain a flicker free display, the digits must be alternated at frequencies exceeding 25 Hz. To operate the buzzer circuit, port RA2 is defined to be high which activates the buzzer circuit and sounds buzzer BZ1. Operation of remote unit 4 is analogous to base unit 3 since a number of circuits are similar.

Operation of the remote unit 4 is controlled by the software program residing in microcontroller U103. A typical sequence of operations executed by microcontroller U103 is as follows:

1. Turn on power conservation circuit for a brief period to make power at regulated voltage available at terminals VD1 and VD2. Once power is available at terminals VD1 and VD2, the system identity circuit, the transceiver circuit and echo detection circuit are powered up. Initialize the remote unit by downloading configuration parameters to the transceiver circuit and reading the system identity from the system identity circuit. After configuration is complete, turn off the power conservation circuit to power down the circuits and put microcontroller U103 in the sleep mode. This reduces power consumption to its lowest value.
2. Listen for transmission from base unit 3 by bringing transceiver circuit and microcontroller U103 out of the sleep mode for a short period (e.g. 5–20 ms) every few seconds (e.g. 1–3 s). Many microcontrollers support this auto awaken feature; i.e. microcontroller U103 brings itself out of sleep mode when a preset time (e.g. 1–3 s) has expired. Once microcontroller U103 is active it can activate the other circuits. Some RF transceivers also have a built in microcontroller so an external microcontroller is not required to switch the transceiver from the active mode to the ultra-low power sleep mode.
3. During this short period of 5–20 ms listen for a wakeup signal from base unit 3 through the wireless transceiver circuit. If a wakeup signal that matches the identity of remote unit 4 is received, proceed to the next step. The system idertity is acquired by microcontroller U103 during step 1. If a wakeup signal is not received, return to step 2.
4. Power on remote unit 4 by turning on power conservation circuit to make power at regulated voltage available at terminals VD1 and VD2. Once power is available at terminals VD1 and VD2, all the circuits with the exception of the voltage booster circuit and the ultrasonic tone generation circuit are powered up.
5. Listen for wireless polling signal from base unit 3 that matches identity of remote unit 4 through the transceiver circuit, and acknowledge polling signal from base unit 3 by transmitting a response signal to base unit 3 through the transceiver circuit.
6. Power up the voltage booster circuit to generate a high voltage necessary to drive ultrasonic transducer LS1, generate a short ultrasonic tone through the ultrasonic tone generator circuit, and power down the voltage booster circuit to conserve power.
7. Determine distance to obstacle by measuring the elapsed time between the ultrasonic tone generation and the ultrasonic echo detected through the ultrasonic echo detection circuit. If no echo is detected within a specified interval, the distance is set to the maximum detection range of the ultrasonic sensor. To improve the measurement, steps 6 and 7 may be repeated multiple times and the distance data averaged over the individual measurements.
8. Convey distance information to base unit 3 by transmitting a distance data signal through the transceiver circuit in response to a distance request signal received through the transceiver circuit from base unit 3.
9. Repeat steps 6–8 until distance request transmissions from base unit 3 cease; i.e. no distance request signals are received within a preset time. This preset time could be 3–20 s. When the preset time elapses, without a distance request signal from base unit 3 being received, go to the next step.
10. Power down power conservation circuit that turns off all circuits, put microcontroller U103 into sleep mode, and return to step 1.

The software program described in steps 1–10 can be modified in several ways to fine tune the performance of the collision warning system and to customize it for different end applications.

This power conservation architecture permits a significant reduction in overall power consumption of remote units 4. For example, since remote unit 4 is listening for wakeup signals from base unit 3 for only 10 ms every 2 s, the average power consumption is $10/2000$ which is 0.5% of the power consumption when remote unit 4 is fully energized. Thus a power reduction of at least a factor of ten is possible between the idle and active modes of the remote unit. This dramatic reduction in power consumption significantly extends the life of onboard battery B101.

The detailed operation of each of the circuits in remote unit 4 is now described. The various circuits are controlled by the input/output (I/O) ports of microcontroller U103. The I/O ports are marked as RA0–RA4 and RB0–RB7. The power conservation circuit supplies power to the other circuits through terminals VD1 and VD2. When the microcontroller is in the low power sleep mode, power is supplied only to the remote unit control circuit through VD1 since transistor Q102 is on. The other circuits are powered down. When microcontroller U103 exits the sleep mode, defining port RB1 to be high turns on the power conservation circuit. Fist this turns on voltage regulator U101 and then turns off transistor Q102 making power at regulated voltage available at VD1. To turn on the system identity circuit and the echo detection circuit, microcontroller U103 defines RB4 to be high which makes power at regulated voltage available at VD2. Microcontroller U103 defines the state of port RB6 to power up or power down transceiver U107. Similarly by defining port RB5 to be high, microcontroller U103 powers on the voltage booster circuit. The power output at VD1 is a regulated voltage. For example, if a 3.6 V battery is used, the battery voltage declines from 3.6 V at beginning of life to 2.8V at the end of life. In this instance, voltage regulator U101 produces a regulated output voltage VD1 of 2.7 V irrespective of battery voltage. The same voltage is available at VD2 when port RB4 is defined to be high. The regulated voltage VD1 and VD2 are used to provide power to voltage sensitive circuits such as the base control circuit, the transceiver circuit, the system identification circuit, and the ultrasonic echo detection circuit. To turn off the power conservation circuit, ports RB1, RB4 and RB5 are defined to below. In addition, the port RB6 is defined so that transceiver U107 is powered down.

To operate the transceiver circuit, microcontroller U103 first turns on transceiver U107 by defining the state of port RB6. Next it puts transceiver U107 in the transmit or receive mode by defining port RB7 to be high or low. Once transceiver U107 is placed in the transmit mode, a data stream is fed serially to transceiver U107 through port RA3. If transceiver U107 is placed in the receive mode, the data stream is received serially from transceiver U107 through port RA4.

The system identity is defined by the state of jumper J101. By keeping selected jumper pairs open or shorted, a unique byte wide system identity can be defined. This system identity is read by parallel in to serial out shift register U102 and then acquired serially from shift register U102 by microcontroller U103 through port RA0. Other ports RA1 and RA2 control the operation of register U102.

An ultrasonic tone is generated by sending a short signal at ultrasonic frequencies through port RB3 to ultrasonic tone generator U105. Ultrasonic tone generator U105 is powered by the voltage booster circuit so that a high voltage (12–15 V or higher) signal is applied to ultrasonic transmitter LS1 to generate an intense ultrasonic tone. If a low voltage (e.g. 3.6 V) signal is applied to ultrasonic transmitter LS1, the ultrasonic tone is too weak to propagate very far and the corresponding echo is too weak to discern. A voltage booster circuit is essential while operating from low voltage power sources such as a single 1 V–3.6 V on-board battery.

The echo of the ultrasonic tone emitted by ultrasonic transmitter LS1 is detected by ultrasonic receiver LS2. The echo is amplified by amplifier U106 and the intensity of the echo compared with a voltage threshold defined by voltage reference D102. If the intensity exceeds the threshold, which indicates a valid echo rather than system noise, amplifier U106 generates an output signal that is detected at port RB0. Microcontroller counts the time elapsed between the ultrasonic tone signal generated on port RB3 and the corresponding echo detection on port RB0 to calculate the distance to the obstacle.

In this manner, the collision warning apparatus 2 is activated for a preset time based on operator preference, uses remote units 4 to monitor distances to obstacles in the vicinity of the vehicle, and utilizes base unit 3 to display distance information to the operator, and alert the operator in case the measured distances are less than preset values. Base unit 3 and remote units 4 that comprise the collision warning apparatus 2 employ power conservation and voltage boosters to extend the lifetime of compact, low voltage on-board power sources, and communicate through wireless means. Collision warning apparatus 2 incorporates auto detection and configuration of remote units 4 for easy system expandability. These attributes make this collision warning apparatus 2 well suited for quick and easy retrofit to existing vehicles.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A vehicle collision warning apparatus that warns an operator of obstacles in the vicinity of a vehicle, comprising:
    a base unit located within a cabin of said vehicle that accepts operator commands, controls operation of said collision warning apparatus, and communicates obstacle position information to said operator; and
    a remote unit located around a periphery of said vehicle that respond to inputs from said base unit, measures the distance between said vehicle and said obstacles, and communicates said obstacle position information to said base unit through a wireless communication link, the remote unit including a battery and electronic circuitry that generally operates in a low-power sleep mode and periodically switches to a higher-power momentary active mode of relatively brief duration to listen for a makeup signal from the base unit, the remote unit's electronic circuitry switching to a fully active mode of limited duration if the wakeup signal is detected and returning to the low-power sleep mode if no wakeup signal is detected.

2. A vehicle collision warning apparatus that warns an operator of obstacles in the vicinity of a vehicle, comprising:
    a base unit located within said vehicle cabin comprising:
        (a) a base unit control circuit means for controlling operation of said base unit;
        (b) a wireless transceiver circuit means for communicating with a remote unit including a wakeup signal;
        (c) a warning indicator circuit means for conveying obstacle position information to said operator; and
        (d) an unswitched power means for supplying power to a first portion of said base unit; and
    a remote unit located on an exterior of said vehicle comprising:
        (a) a remote unit control circuit means for controlling operation of said remote unit;
        (b) a distance measuring circuit means for measuring the distance between said vehicle and said obstacles;
        (c) a wireless transceiver circuit means for communicating with said base unit;
        (d) an unswitched power means for supplying power to a first portion of said remote unit;
        (e) a switched power means for selectively supplying power to a second portion of said remote unit based on wireless communication from said base unit; and
        (f) a power conservation circuit means for operating the remote unit in a low-power sleep mode and periodically switching to a high-power active mode of relatively brief duration to listen for the wakeup signal from the base unit, for switching to a fully active mode involving the switched power means if the wakeup signal is detected and for returning to the low-power sleep mode if the wakeup signal is not detected.

3. The vehicle collision warning apparatus in accordance with claim 2 wherein said unswitched power means comprises a battery.

4. The vehicle collision warning apparatus in accordance with claim 3 further comprising a solar panel for providing charging power to said battery.

5. The vehicle collision warning apparatus in accordance with claim 2 wherein said distance measuring circuit means comprises an ultrasonic sensing means for measuring the distance between said vehicle and said obstacles.

6. The vehicle collision warning apparatus in accordance with claim 2 wherein said distance measuring circuit means comprises a radar sensing means for measuring the distance between said vehicle and said obstacles.

7. The vehicle collision warning apparatus in accordance with claim 2 wherein said wireless transceiver circuit means comprises an RF communication means for communicating control signals and said obstacle information between said remote unit and said base unit.

8. The vehicle collision warning apparatus in accordance with claim 2 wherein said wireless transceiver circuit means comprises microwave communication means for communicating control signals and said obstacle information between said remote unit and said base unit.

9. The vehicle collision warning apparatus in accordance with claim 2 wherein said wireless transceiver circuit means comprises an ultrasonic communication means for communicating control signals and said obstacle information between said remote unit and said base unit.

10. The vehicle collision warning apparatus in accordance with claim 2 wherein said warning indicator circuit means comprises:

(a) visual signal means for displaying said obstacle information to said operator; and (b) an audio signal means for alerting said operator about said obstacles in the vicinity of said vehicle.

11. The vehicle collision warning apparatus of claim 2 wherein said first portion of said remote unit includes a receiving means of said wireless transceiver circuit means for receiving wireless transmissions from said base unit.

12. The vehicle collision warning apparatus of claim 2 wherein said second portion of said remote unit means includes said distance measuring circuit means and a transmitting means of said wireless transceiver circuit means for transmitting information to said base unit.

13. A method of operating a vehicle collision warning system having a base unit located within a cabin of said vehicle and a remote unit located around a periphery of said vehicle, the method comprising the steps of:

providing the remote unit with an unswitched self-contained power source for locating said remote unit on said vehicle without electrically connecting it to said vehicle;

operating the remote unit in a low-power sleep mode a majority of the time;

periodically entering a higher-power listening mode and listening for a wakeup signal from the base unit;

switching to a highest-power distance-measurement mode if the wakeup signal is heard; and returning to the low-power sleep mode if the wakeup signal is not heard.

14. The method of claim 13 wherein the remote unit periodically enters the higher power listening mode every 1–3 seconds.

15. The method of claim 14 wherein the remote unit periodically enters the higher-power listening mode for 5–20 ms.

16. The method of claim 13 further comprising the step of briefly generating a higher voltage to power a distance measurement circuit when the remote unit is switched to the highest-power distance measurement mode.

* * * * *